United States Patent
Kageyama et al.

(10) Patent No.: US 8,666,582 B2
(45) Date of Patent: Mar. 4, 2014

(54) APPARATUS FOR IMPROVING STEERING SENSITIVITY OF VEHICLE

(75) Inventors: Yusuke Kageyama, Isehara (JP); Kazuhito Kato, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/695,510

(22) PCT Filed: Apr. 13, 2011

(86) PCT No.: PCT/JP2011/059176
§ 371 (c)(1),
(2), (4) Date: Oct. 31, 2012

(87) PCT Pub. No.: WO2011/145410
PCT Pub. Date: Nov. 24, 2011

(65) Prior Publication Data
US 2013/0054073 A1    Feb. 28, 2013

(30) Foreign Application Priority Data
May 18, 2010   (JP) .................................. 2010-114698

(51) Int. Cl.
*G05D 1/00*   (2006.01)
*B62D 6/00*   (2006.01)
*B60W 20/00*   (2006.01)
*B60W 10/08*   (2006.01)
*B60W 10/06*   (2006.01)
*B60K 6/445*   (2007.10)

(52) U.S. Cl.
CPC *B62D 6/00* (2013.01); *B60W 20/00* (2013.01); *B60W 10/08* (2013.01); *B60W 10/06* (2013.01); *B60K 6/445* (2013.01)
USPC .................. 701/22; 701/41; 701/42; 701/37; 701/72; 701/89; 180/6.44; 180/6.48; 180/417; 180/421; 180/422; 91/437; 60/468; 251/297

(58) Field of Classification Search
USPC .............. 701/22, 41, 42; 180/6.44, 6.48, 417, 180/421, 422, 423, 426, 428, 429, 441, 443, 180/444, 446; 91/437; 137/625.24; 60/468; 251/297
See application file for complete search history.

(56) References Cited

U.S. PATENT DOCUMENTS 6,007,443 A * 12/1999 Onimaru et al. ................. 475/5
6,929,090 B2 * 8/2005 Furumi et al. ............... 180/446

(Continued)

FOREIGN PATENT DOCUMENTS

JP    2005-145141 A   6/2005
JP    2005-343302 A   12/2005

(Continued)

OTHER PUBLICATIONS

"Non-Grounding Force Interface Using Nonlinearity of Human Perception", issued by NTT.

(Continued)

*Primary Examiner* — McDieunel Marc
(74) *Attorney, Agent, or Firm* — Foley & Lardner LLP

(57) ABSTRACT

A vehicle steering feel improving apparatus is provided for a vehicle, wherein the vehicle is capable of running with a road wheel driven by a driving force from a power source. The vehicle steering feel improving apparatus includes a steering operation detecting means that detects a condition that steering operation is being performed to steer a steerable wheel of the vehicle. A driving force fluctuating means repeatedly fluctuates the driving force to the road wheel, while the steering operation detecting means is detecting the condition that steering operation is being performed.

9 Claims, 6 Drawing Sheets

(56) References Cited

U.S. PATENT DOCUMENTS

| | | | |
|---|---|---|---|
| 7,014,008 B2 * | 3/2006 | Furumi et al. | 180/443 |
| 7,372,223 B2 * | 5/2008 | Yamaguchi et al. | 318/254.1 |
| 7,373,230 B2 | 5/2008 | Rattapon et al. | |
| 7,406,374 B2 * | 7/2008 | Ono et al. | 701/41 |
| 7,630,796 B2 * | 12/2009 | Okada et al. | 701/1 |
| 7,934,779 B2 * | 5/2011 | Kodama et al. | 303/151 |
| 8,002,057 B2 * | 8/2011 | Tanaka et al. | 180/65.265 |
| 8,332,115 B2 * | 12/2012 | Kodama et al. | 701/70 |
| 2004/0007416 A1 * | 1/2004 | Furumi et al. | 180/443 |
| 2005/0087390 A1 * | 4/2005 | Furumi et al. | 180/446 |
| 2005/0273234 A1 | 12/2005 | Rattapon et al. | |
| 2009/0236160 A1 * | 9/2009 | Tanaka et al. | 180/65.265 |
| 2010/0222978 A1 * | 9/2010 | Kodama et al. | 701/70 |

FOREIGN PATENT DOCUMENTS

| | | |
|---|---|---|
| JP | 2007-001449 A | 1/2007 |
| JP | 2007-20354 A | 1/2007 |
| JP | 2007-282330 A | 10/2007 |
| JP | 2008-81008 A | 4/2008 |
| JP | 2010-52525 A | 3/2010 |

OTHER PUBLICATIONS

Japanese Office Action dated Dec. 3, 2013, (2 pgs.).

* cited by examiner

APPARATUS FOR IMPROVING STEERING SENSITIVITY OF VEHICLE

TECHNICAL FIELD

The present invention relates to apparatus for improving the steering feel of a vehicle that is capable of running with a road wheel driven by a driving force from a power source, wherein the improvement is implemented by controlling the driving force of the road wheel.

BACKGROUND ART

In general, the steering feel of a vehicle is discussed from the viewpoint of how a steering effort is with respect to a steering input (steering angle) set by a driver. If the steering effort is too small, the steering input (steering angle) tends to become excessively large so that behavior of the vehicle becomes larger than expected by the driver. This makes the driver fail to feel a sense of togetherness with the vehicle and a sense of safety, and forces the driver to perform corrective steering operation frequently. On the other hand, if the steering effort is too large, driving operation requires a large effort for a long time period especially for long distance driving, and thereby makes the driver feel a sense of fatigue.

Accordingly, the steering effort needs to be suitable in magnitude with respect to the steering input (steering angle). If the steering effort is suitable in magnitude, the driver can feel a sense of togetherness with the vehicle and a sense of safety, and thereby perform smooth steering operation with an improved steering feel. This makes it unnecessary to perform corrective steering operation, and prevents the driver from feeling a sense of fatigue due to heavy steering operation.

In order to enhance the steering feel, it is usual in general to use a method as described below. Namely, in a case where a steering system is a hydraulic power steering system, a valve whose opening changes in response to relative rotation according to a steering load is designed to have a characteristic of change of opening such that the steering feel is set as intended for each vehicle. In a case where a steering system is an electronic power steering system, a motor that power-assists a steering effort is controlled to have a characteristic of assist torque such that the steering feel is set as intended for each vehicle.

However, in the case of the hydraulic power steering system, it is necessary to change specifications of components in order to set the valve opening characteristic as intended. In the case of the electronic power steering system, it is necessary to change specifications of the assist motor in order to set the assist motor torque characteristic as intended. Either case has a problem that the cost becomes high.

Another countermeasure for enhancing the steering feel has been proposed and disclosed, for example, in patent document 1. This proposed technique is to detect the lateral acceleration of a vehicle, and calculate an assist torque of a power steering system for obtaining an optimal steering effort with respect to the lateral acceleration, and assist driver's steering effort by the assist torque, and thereby set the steering effort felt by the driver to an optimal one with respect to the lateral acceleration.

However, the prosed technique described in patent document 1 requires a means for detecting the lateral acceleration of the vehicle, and thereby has a similar problem of high cost as the usual countermeasures described above for the cases of the hydraulic power steering system and the electronic power steering system. Accordingly, a device has been desired which is capable of improving the steering feel without change of specifications of components of a power steering system and without an additional means for detecting the lateral acceleration.

PRIOR ART DOCUMENT(S)

Patent Document(s)

Patent Document 1: JP 2005-343302 A

SUMMARY OF THE INVENTION

The present invention is based on recognition of the fact that if the driving force of a road wheel is fluctuated during steering operation, an increase of driving force causes an increase of steering effort, and then a decrease from the increased driving force causes a decrease of steering effort from the increased value, from the viewpoint from that with a periodic input of a larger force and a smaller force, a human hand has a sense of tough that feels the larger force more sensitively as a whole, as disclosed in a document "Non-Grounding Force Interface Using Nonlinearity of Human Perception" issued by NTT. This conception has been embodied to propose a vehicle steering feel improving apparatus configured to be capable of improving the steering feel by setting suitable in magnitude the steering effort felt by hands of a driver during steering operation, inexpensively without causing a factor for increasing the cost as described above, by repeatedly fluctuating the road wheel driving force during steering operation, and thereby fluctuating the steering effort.

According to the present invention, a vehicle steering feel improving apparatus for a vehicle, wherein the vehicle is capable of running with a road wheel driven by a driving force from a power source, the vehicle steering feel improving apparatus comprises: a steering operation detecting means that detects a condition that steering operation is being performed to steer a steerable wheel of the vehicle; and a driving force fluctuating means that repeatedly fluctuates the driving force to the road wheel, while the steering operation detecting means is detecting the condition that steering operation is being performed.

The vehicle steering feel improving apparatus according to the present invention can repeatedly fluctuate the driving force to the road wheel during steering operation, and thereby fluctuate the steering effort in the same cycle as the fluctuation of the driving force.

Since the driver feels the larger steering effort more sensitively in the steering effort fluctuating periodically when the steering effort is repeatedly fluctuating, it is possible to set suitable in magnitude the steering effort felt by the driver during steering operation, inexpensively without causing an increase of the cost as in conventional cases, only by setting of the cycle of fluctuation of the driving force, and thereby improve the steering feel.

MODE(S) FOR CARRYING OUT THE INVENTION

Figure 1:
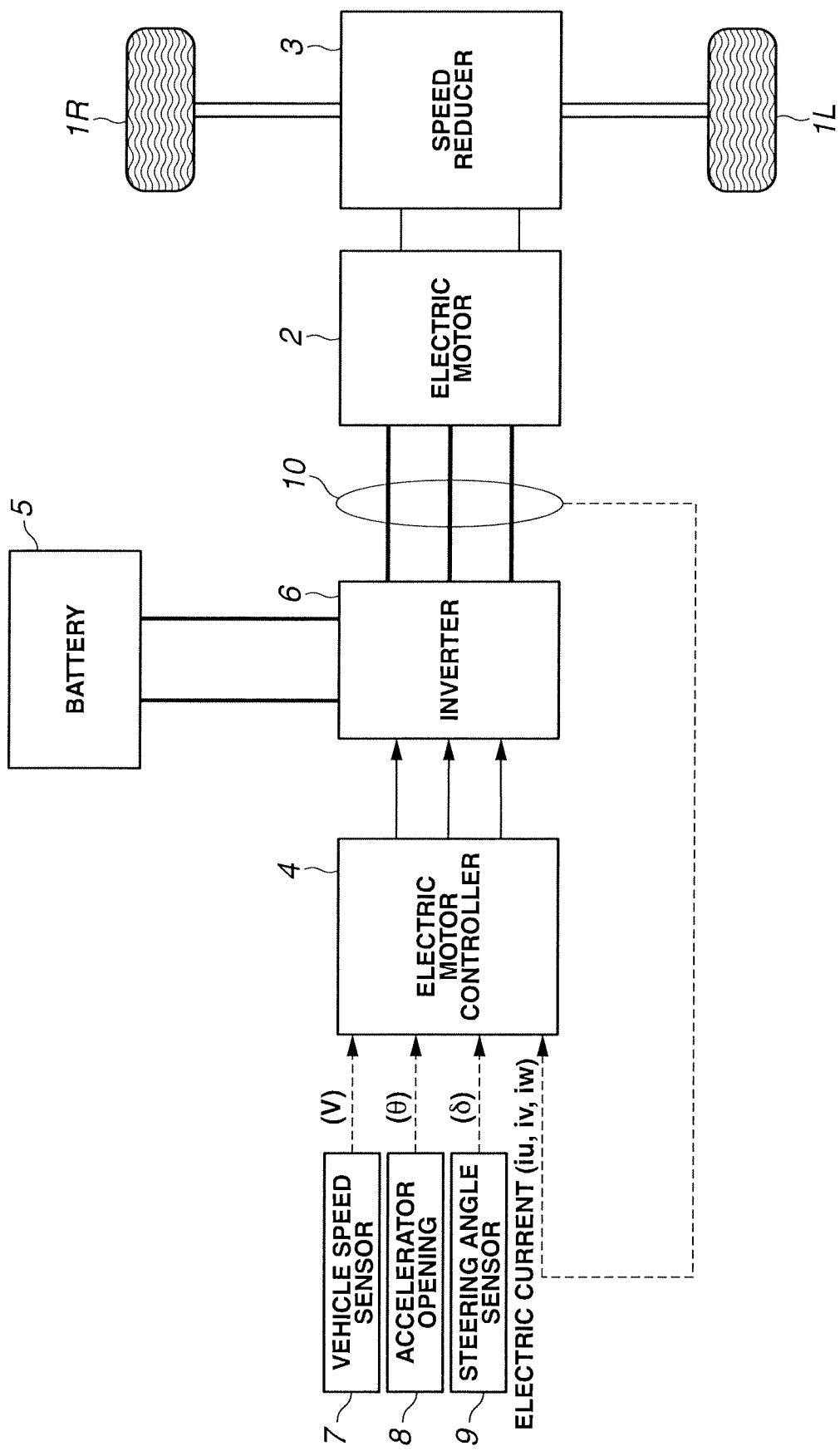
FIG. 1 is a schematic system diagram showing a drive system of a vehicle and a control system for the drive system, wherein the vehicle is provided with a steering feel improving apparatus according to an embodiment of the present invention.

The following describes modes for carrying out the present invention with reference to an embodiment shown in the drawings.

<Configuration> FIG. 1 shows a drive system of a vehicle and a control system for the drive system, wherein the vehicle is provided with a steering feel improving apparatus according to an embodiment of the present invention. In the embodiment, the vehicle of FIG. 1 is an electric vehicle that is capable of running with left and right front wheels 1L, 1R driven, wherein left and right front wheels 1L, 1R are steerable wheels. The driving of left and right front wheels 1L, 1R is implemented by driving the left and right front wheels 1L, 1R by an electric motor 2 as a power source through a speed reducer 3, wherein speed reducer 3 includes a differential gear.

The driving force of electric motor 2 is controlled by an electric motor controller 4 which performs DC-AC conversion from power of a battery 5 as a power supply by an inverter 6, and supplies the AC power to electric motor 2 under control of inverter 6, so as to conform the torque of electric motor 2 to a target motor torque as a result of calculation obtained by electric motor controller 4.

If the target motor torque as a result of calculation obtained by electric motor controller 4 is of a negative polarity which requests regenerative braking operation of electric motor 2, then electric motor controller 4 applies a load of generation to electric motor 2 through inverter 6, and performs AC-DC conversion from the power generated by regenerative braking operation of electric motor 2, and charges battery 5.

Electric motor controller 4 receives input of information used to calculate the target motor torque (target driving force) described above. The information includes a signal from a vehicle speed sensor 7 that detects a vehicle speed V that is a speed of the electric vehicle with respect to ground, and a signal from an accelerator opening sensor 8 that detects an accelerator opening θ (electric motor requested load) made by driving operation, and a signal from a steering angle sensor 9 that detects steering angle δ of a steering wheel not shown, which steering wheel is operated by a driver for steering left and right front wheels (steerable wheels) 1L, 1R, and a signal from an electric current sensor 10 that detects electric currents of electric motor 2 (electric currents iu, iv, iw in FIG. 1, for creating three-phase alternating currents composed of U-phase, V-phase, and W-phase).

Electric motor controller 4 generates a PWM signal for controlling the electric motor 2 based on the above information, and generates a drive signal for inverter 6 through a drive circuit based on the PWM signal. For example, inverter 6 is composed of two switching elements (for example, power semiconductor elements such as IGBTs) for each phase, and supplies a desired current to electric motor 2 while turning ON/OFF the switching elements according to the drive signal and performing conversion from the direct current supplied from battery 5 to AC and reverse conversion.

Electric motor 2 generates a driving force based on the AC current supplied from inverter 6, and transmits the driving force to left and right front wheels 1L, 1R (left and right steerable wheels) through speed reducer 3. While the vehicle is running so that electric motor 2 is dragged by left and right front wheels 1L, 1R, i.e. electric motor 2 is in the so-called state of inverse drive, electric motor 2 is applied with a load of generation to perform regenerative braking operation, and regenerate the kinetic energy of the vehicle, and charge the battery 5.

<Vehicle Steering Feel Improving Control> Electric motor controller 4 executes a control program shown in FIG. 2, and performs a vehicle steering feel improving control through driving force control for electric motor 2 as follows.

At Step S11, electric motor controller 4 reads steering angle δ. At Step S12, electric motor controller 4 checks whether or not the absolute value |δ| of steering angle δ satisfies |δ|>0 (actually, a set value for steering check in consideration of a dead band, instead of "0"), and thereby determines whether it is in a steered condition in which left and right front wheels 1L, 1R are steered or in an unsteered condition in which left and right front wheels 1L, 1R are unsteered. Accordingly, Steps S11 and S12 correspond to a steering operation detecting means in the present invention.

Instead of the foregoing, the determination whether or not steering operation is performed may be implemented by checking based on road wheel speed of each road wheel whether or not a difference in road wheel speed between left and right front wheels 1L, 1R, or a difference in road wheel speed between left and right rear wheels not shown, or a difference in road wheel speed between front and rear wheels not shown, namely, a difference between an average road wheel speed of left and right front wheels 1L, 1R and an average road wheel speed of left and right rear wheels not shown, is above a threshold for steering check.

While it is determined at Step S12 that steering operation is not performed, it is unnecessary to perform vehicle steering feel improving control, so that electric motor controller 4 returns the control to Step S11, and waits while repeatedly performing the steering start determination at Step S12 until steering operation is performed. At a time instant when it is determined at Step S12 that steering operation is performed, vehicle steering feel improving control should be started. Accordingly, electric motor controller 4 makes the control proceed to Step S13 and the following steps, where electric motor controller 4 performs vehicle steering feel improving control through driving force control of electric motor 2 as follows.

At Step S13, electric motor controller 4 checks whether or not it is before a timer TM indicates a set time period TM1s (0<TM<TM1s), wherein timer TM measures a time period elapsed after start of steering operation. While (0<TM<TM1s) is determined at Step S13, namely, while it is determined that it is in set time period TM is from a time instant t1 in FIG. 3 when steering operation is started, electric motor controller 4 performs at Step S14 a motor torque increasing correction of correcting a target motor torque of electric motor 2 by addition of a driving torque correction ΔTm for the time immediately after time instant t1 when steering operation is started, as indicated by a waveform of torque in FIG. 3, wherein the target motor torque is determined based on vehicle speed V and accelerator opening APO by using a prepared motor torque map.

In the present specification, "target motor torque" is used to refer not only a driver request torque determined based on vehicle speed V and accelerator opening APO as described above, but also a corrected target motor torque after correction in response to a driving force control request if the driving force control request is presented by factors (vehicle behavior control, and traction control) other than the driver request. Namely, "target motor torque" may be used for any kind of motor torque that is determined based on a state of operation of the vehicle.

At Step S15, electric motor controller 4 checks whether or not the absolute value of steering angle |δ| satisfies |δ|>0, and thereby determines whether steering operation is continued after time instant t1 when it is determined at Step S12 that steering operation is started. Accordingly, Step S15 constitutes the steering operation detecting means in the present invention as well as Steps S11 and S12.

While it is determined at Step S15 that steering operation is performed, electric motor controller 4 returns the control to Step S11 and Step S12, and then makes the control proceed from Step S12 to step S13 because steering operation is performed. While (0<TM<TM1s) is determined at Step S13, namely, while it is determined that it is before a time instant t2 when set time period TM1s has elapsed from time instant t1 in FIG. 3 when steering operation is started, electric motor controller 4 continues the motor torque increasing correction of Step S14, as indicated by a waveform of torque in FIG. 3.

Figure 3:
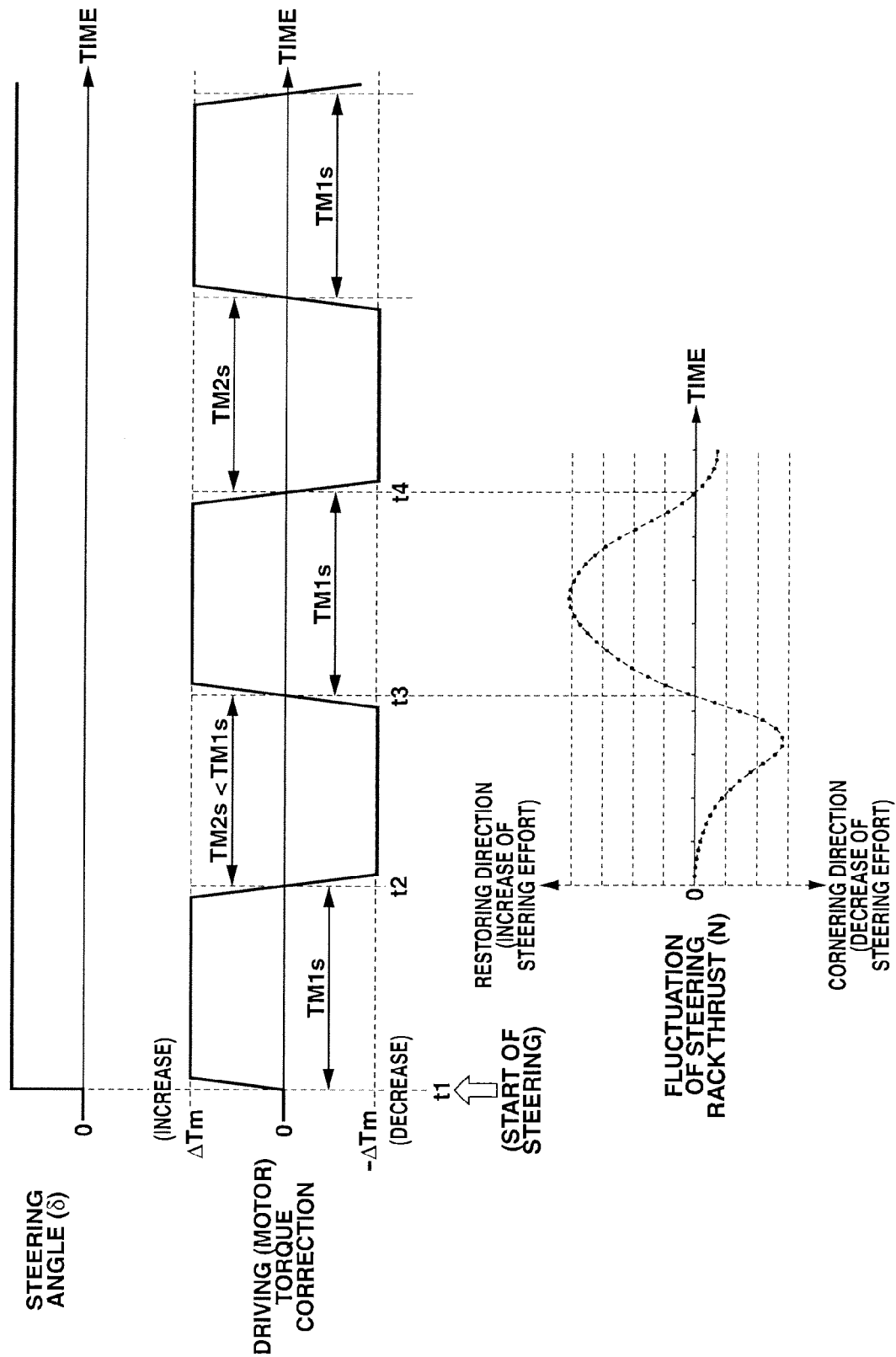
FIG. 3 is a time chart of operation of the steering feel improving control of FIG. 2.

When it is determined at Step S13 that (0<TM<TM1s) becomes unsatisfied, namely, after time instant t2 when set time period TM1s has elapsed from time instant t1 of FIG. 3 when steering operation is started, electric motor controller 4 makes the control proceed to Step S16 and Step S17 where electric motor controller 4 terminates the motor torque increasing correction of Step S14, and then shifts to the following motor torque correction control.

At Step S16, electric motor controller 4 performs a motor torque reducing correction of correcting the target motor torque of electric motor 2 described above by reduction of a driving torque correction (−ΔTm) for the time immediately after time instant t2 of FIG. 3. This motor torque reducing correction is performed for a period between time instant t2 of FIG. 3 and a time instant t3 when a set time period TM2s has elapsed after time instant t2. The driving torque reducing correction (−ΔTm) is set equal to the driving torque increasing correction ΔTm described above in absolute value. On the other hand, motor torque decrease time period TM2s is set shorter than motor torque increase time period TM1s described above.

At Step S17, which is performed when the motor torque reducing correction of Step S16 is terminated (at time instant t3 in FIG. 3), electric motor controller 4 performs a motor torque increasing correction of correcting the target motor torque of electric motor 2 described above by increase of driving torque correction ΔTm for the time immediately after time instant t3 of FIG. 3. This motor torque increasing correction is performed for a period between time instant t3 in FIG. 3 and a time instant t4 when the same set time period TM1s as at Step S14 has elapsed.

After Step S17 where the motor torque increasing correction is performed, electric motor controller 4 checks at Step S15 whether or not the absolute value of steering angle |δ| satisfies |δ|>0, and thereby determines whether steering operation is continued after time instant t4 in FIG. 3 when the motor torque increasing correction is terminated. While it is determined at Step S15 that steering operation is performed, electric motor controller 4 returns the control to Step S11 and Step S12, and then makes the control proceed from Step S12 to step S13 because steering operation is performed. When the current TM≥TM1s is determined at Step S13, electric motor controller 4 makes the control proceed to Step S16 and Step S17.

Accordingly, if steering operation is continued after time instant t4 in FIG. 3, the driving torque correction (−ΔTm, ΔTm) indicated after time instant t4 is used to repeatedly perform the reducing correction (Step S16) and the increasing correction (Step S17) to the target motor torque of electric motor 2. When the driver turns the steering wheel back to a neutral position and terminates steering operation, electric motor controller 4 determines at Step S15 that the steering operation is terminated based on the absolute value of steering angle |δ|=0, and then returns from the loop of FIG. 2, so that electric motor controller 4 stops performing the reducing correction (Step S16) and the increasing correction (Step S17), and controls the electric motor 2 to output the target motor torque.

Figure 2:
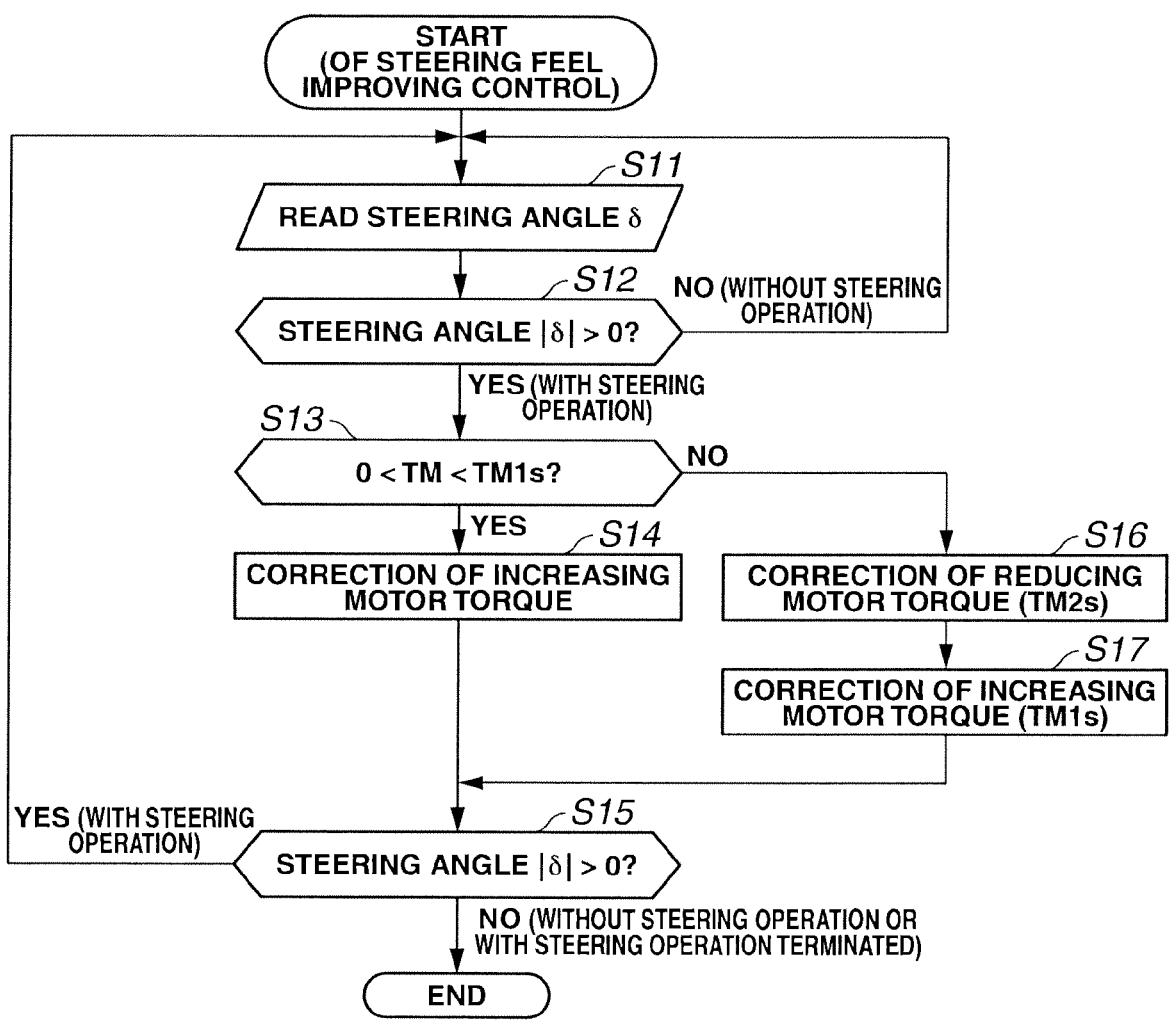
FIG. 2 is a flow chart showing a steering feel improving control program executed by an electric motor controller in FIG. 1.

By the steering feel improving control of FIG. 2, the torque of electric motor 2 is repeatedly fluctuated as indicated by a waveform of torque fluctuation in FIG. 3 with respect to the target motor torque after time instant t1 in FIG. 3 when steering operation is started. First, the torque of electric motor 2 is controlled to a value that is increased by the quantity ΔTm indicated by a waveform of torque fluctuation in FIG. 3 with respect to the target motor torque at Step S14 for a period from time instant t1 when steering operation is started to time instant t2 when set time period TM1s has elapsed.

Then, during a period from time instant t2 when the motor torque increasing correction is terminated to time instant t3 when set time period TM2s has elapsed, the torque of electric motor 2 is controlled to a value that is reduced by the quantity (−ΔTm) indicated by a waveform of torque fluctuation in FIG. 3 with respect to the target motor torque at Step S16. Thereafter, during a period from time instant t3 when the motor torque reducing correction is terminated to time instant t4 when set time period TM1s has elapsed, the torque of electric motor 2 is controlled to a value that is increased by the quantity ΔTm indicated by a waveform of torque fluctuation in FIG. 3 with respect to the target motor torque at Step S17.

Thereafter, the torque of electric motor 2 is controlled as in the period from time instant t2 to time instant t4 by repeatedly executing Step S16 and Step S17, to repeat the pattern of decrease and increase. Accordingly, Steps S14, S16 and S17 correspond to a driving force fluctuating means in the present invention.

The foregoing motor driving force fluctuating correction control serves to improve vehicle steering feel as follows.

The following describes the relationship between the steering effort and the fluctuation of the motor torque (road wheel driving force) when steering operation is being performed. In a case where specifications about tire contact surface are as shown in FIG. 4, a cornering moment M generated by individual steerable wheel (front wheel) 1L, 1R can be determined by using the following equation by subtracting the second term of the right hand side of the equation from the first term of the right hand side of the equation, wherein the first term is a cornering moment resulting from a lateral force σy, and the second term is a cornering moment resulting from a driving force σx.

$$M = b\left[\int_0^{x'}\left(x' - \frac{l}{2}\right)\sigma_y\,dx' + \int_{x'}^{l}\left(x' - \frac{l}{2}\right)(-\mu p \sin\theta)\,dx'\right] - \\ b\left[\int_0^{x'} y\sigma_x\,dx' + \int_{x'}^{l}\frac{\mu p \sin\theta}{K_y}(-\mu p \cos\theta)\,dx'\right]$$ (Equation 1)

Figure 4:
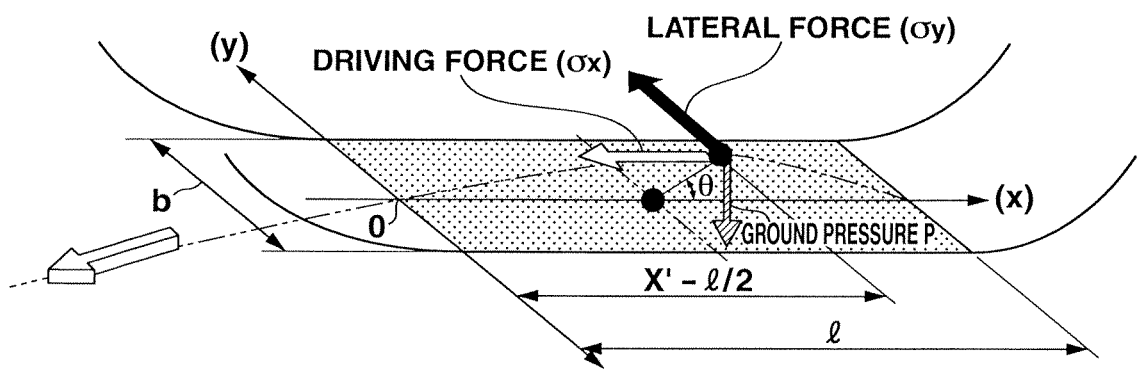
FIG. 4 is an explanation diagram showing specifications of a steerable wheel about tire contact surface.
Figure 5:
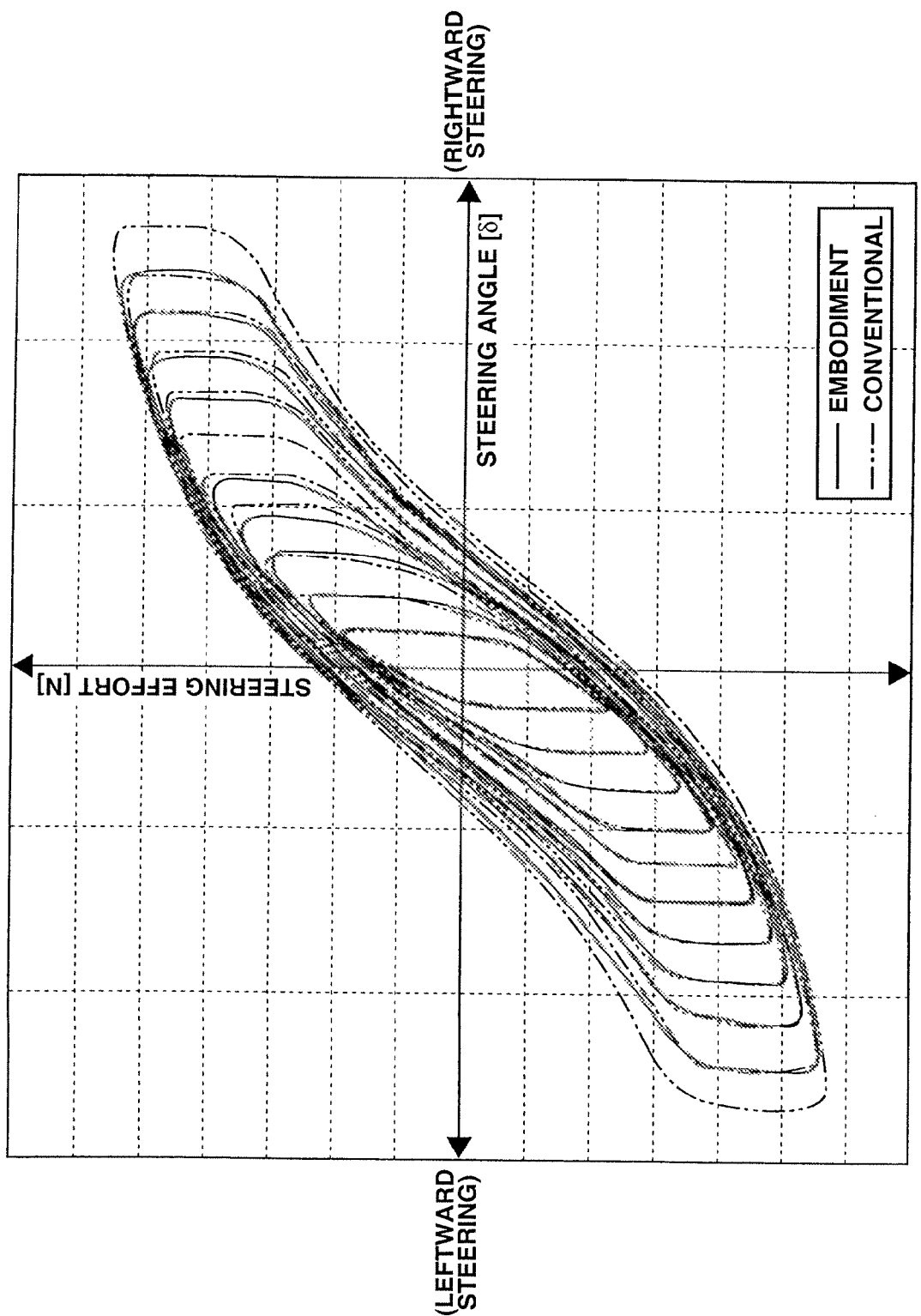
FIG. 5 is a steering effort change characteristic diagram showing characteristics of change of steering effort with respect to steering angle for a case where the control program of FIG. 2 is executed and those for a case where the control program of FIG. 2 is not executed in comparison with each other.

When the motor torque is increased as in the period of t1-t2 and the period of t3-t4, a longitudinal force in a vehicle forward direction, namely, a driving force σx as shown in FIG. 4, is generated on the tire contact surface of front wheel 1L, 1R which is being steered. On the other hand, while steering operation is being performed, a load shift toward the outside of cornering causes a movement of the tire contact point of the cornering-outside front wheel outward in the vehicle lateral direction, and also causes a movement of the tire contact point of the cornering-inside front wheel inward in the vehicle lateral direction, wherein the outside and inside contact points are subject to the driving forces σx respectively.

The driving force σx results in a moment for turning the steered front wheel 1L, 1R around a kingpin axis, whereas the driving force σx under the condition where the motor torque is increased provides to front wheel 1L, 1R a restoring moment for turning the steered front wheel 1L, 1R back to the neutral position. Incidentally, a restoring moment is a moment in a direction to resist the operation of the steering wheel made by the driver. Accordingly, this serves as a restoring thrust to increase the steering effort, as shown in the example of FIG. 3 showing the fluctuation of steering rack thrust during the period t3-t4 when the motor torque is increased.

On the other hand, when the motor torque is reduced as in the period of t2-t3 and immediately after t4, a longitudinal force in a vehicle rearward direction, namely, a driving force σx in the direction opposite to the direction in FIG. 4, is generated on the tire contact surface of front wheel 1L, 1R which is being steered. This driving force σx acts on the tire contact point of the cornering-outside front wheel and the contact point of the cornering-inside front wheel which are moved as described above, and results in a moment for turning the steered front wheel 1L, 1R around the kingpin axis.

Since the driving force σx when the motor torque is reduced is in the direction opposite to the direction when the motor torque is increased, it applies to front wheel 1L, 1R a moment in the cornering direction to further steer the steered front wheel 1L, 1R. This moment in the cornering direction is a direction to conform to the operation of the steering wheel made by the driver, and serves as a thrust in the cornering direction and reduces the steering effort, as shown in the example of FIG. 3 showing the fluctuation of steering rack thrust during the period t2-t3 when the motor torque is reduced.

The driving torque increasing and reducing corrections (ΔTm, −ΔTm) are required to be large enough to allow the driver to feel the change of steering effort generated as discussed above. However, if the driving torque increasing and reducing corrections (ΔTm, −ΔTm) are such that the driver feels acceleration and deceleration, it is uncomfortable to the driver. Accordingly, the driving torque increasing and reducing corrections (ΔTm, −ΔTm) are set so as to prevent the driver from feeling acceleration and deceleration.

Accordingly, even if the steered condition motor torque fluctuating correction according to the present embodiment is performed, characteristics of steering effort with respect to steering angle δ are actually measured as indicated by solid lines, which are not different very much from those for the case where the steered condition motor torque fluctuating correction is not performed, which are indicated by long dashed double short dashed lines. However, if the steering effort is fluctuated repeatedly by the steered condition motor torque fluctuating correction as described with reference to FIG. 3, the driver tends to feel, by the hands operating the steering wheel, the larger (increased) steering effort more sensitively than the smaller (reduced) steering effort, and thereby feel the larger (increased) steering effort more significantly as a whole.

Accordingly, the feature of performing the steered condition motor torque fluctuating correction to cause repeated fluctuation of the steering effort as described with reference to FIG. 3, serves to set suitable in magnitude the steering effort felt by the driver by hands, only with setting of motor torque increase and decrease time periods TM1s, TM2s, and thereby improve the steering feel so that the driver can feel a sense of togetherness with the vehicle and a sense of safety.

Moreover, as described above, the feature of setting the motor torque increase time period TM1s and motor torque decrease time period TM2s in a relationship in magnitude of TM1s>TM2s, serves to improve the steering feel further reliably. It is preferable to set the motor torque increase time period TM1s and motor torque decrease time period TM2s in a relationship in ratio such that the ratio therebetween (TM1s/TM2s) is held constant regardless of steering speed, and thereby obtain the improvement of the steering feel described above at any steering speed.

Figure 6:
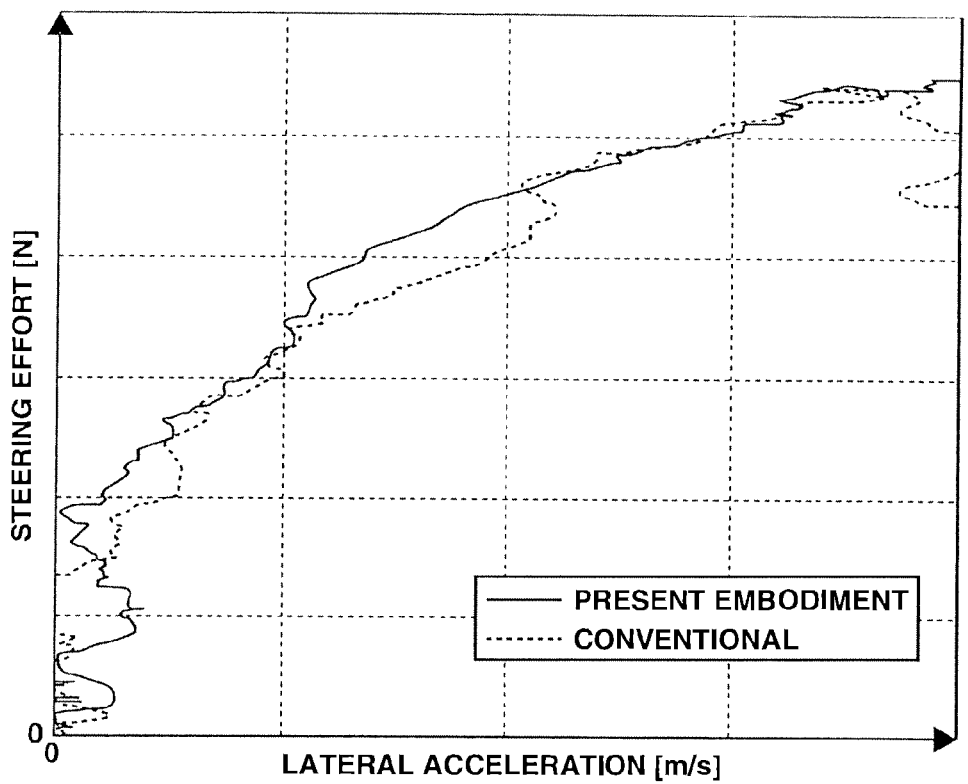
FIG. 6 is a steering effort change time chart showing characteristics of change of steering effort with respect to lateral acceleration which characteristics are obtained through actual running in a test course simulating a suburban road for a case where the control program of FIG. 2 is executed and those for a case where the control program of FIG. 2 is not executed in comparison with each other.
Figure 7:
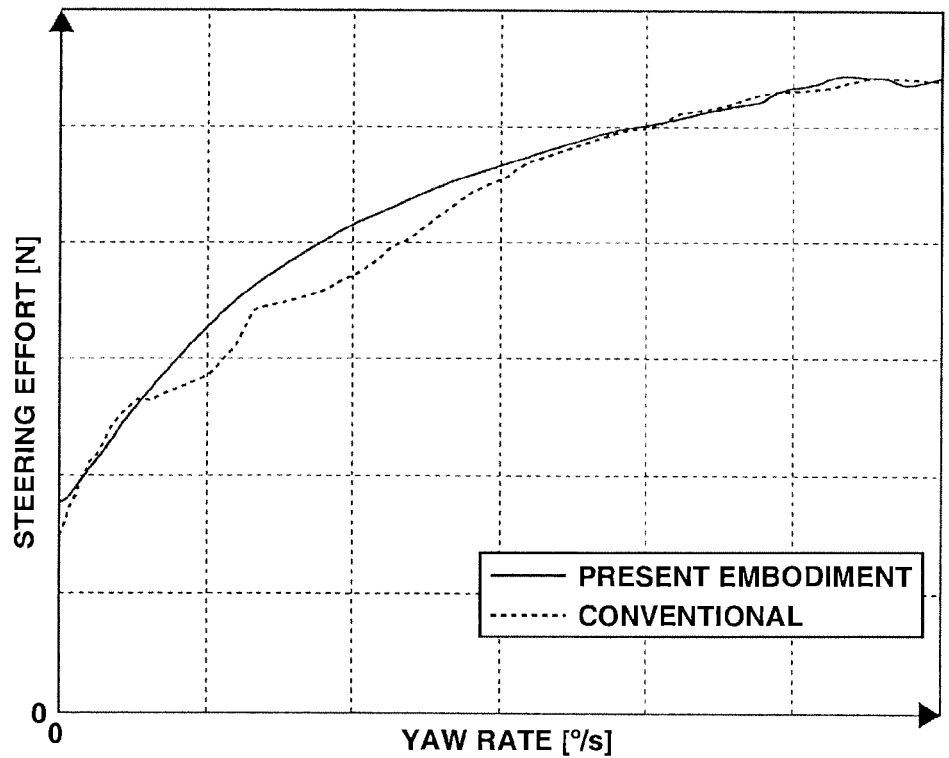
FIG. 7 is a steering effort change time chart showing characteristics of change of steering effort with respect to yaw rate which characteristics are obtained through actual running in a test course simulating a suburban road for a case where the control program of FIG. 2 is executed and those for a case where the control program of FIG. 2 is not executed in comparison with each other.

FIG. 6 shows characteristics of change of steering effort with respect to lateral acceleration which characteristics are obtained through actual running in a test course simulating a suburban road. FIG. 7 shows characteristics of change of steering effort with respect to yaw rate which characteristics are obtained through actual running in the test course. Solid lines in FIGS. 6 and 7 indicate characteristics of change of steering effort for a case where the steered condition motor torque fluctuating correction according to the present embodiment is performed to repeatedly fluctuate the steering effort as described above with reference to FIG. 3. Broken lines in FIGS. 6 and 7 indicate characteristics of change of steering effort for a case where the steered condition motor torque fluctuating correction according to the present embodiment is not performed (namely, no repeated fluctuation of steering effort is generated).

In the case where the steered condition motor torque fluctuating correction according to the present embodiment is not performed (namely, no repeated fluctuation of steering effort is generated), the driver fails to perform smooth steering operation and frequently performs corrective steering operation, as clear by broken lines in FIGS. 6 and 7, since the steering feel is not one allowing the driver to feel a sense of togetherness with the vehicle and feel safe. In contrast, in the case where the steered condition motor torque fluctuating correction according to the present embodiment is performed to repeatedly fluctuate the steering effort, it is possible to set suitable in magnitude the steering effort felt by the driver by hands during steering operation, with setting of steered condition motor torque increase and decrease time periods TM1s, TM2s in FIG. 3, and thereby improve the steering feel to allow the driver to feel a sense of togetherness with the vehicle and a sense of safety. This allows the drive to perform smooth steering operation nearly without corrective steering operation as clear by the solid lines in FIGS. 6 and 7.

Moreover, according to the present embodiment, it is possible to obtain the advantageous effects described above only by the setting of steered condition motor torque increase and decrease time periods TM1s, TM2s in FIG. 3, and thereby achieve the improvement of the steering feel described above with a low cost without the conventional necessity of change of specifications of components of the power steering system and without the conventional necessity of an additional means such as lateral acceleration detecting means.

Moreover, in the present embodiment, the feature that for the steered condition motor torque fluctuating correction of FIG. 3, the torque correction to be started at time instant t1 when steering operation is started is implemented by the motor torque increasing correction as in the period of time instant t1 to time instant t2, produces the following advantageous effect. If the motor torque increasing correction is performed to increase the road wheel driving force as in the early stage from time instant t1 to time instant t2 as in the present embodiment, the cornering moment resulting from the difference between the cornering-outside wheel cornering moment and the cornering-inside wheel cornering moment (restoring moment) becomes larger during the early stage, so that an apparent lateral force obtained by dividing the difference in moment by a center-of-mass-to-axle distance is increased during the early stage.

As a result, the yaw rate of the vehicle quickly rises during the early stage during the early stage after start of steering operation, and the value of yaw rate itself is increased, so that the response of turning of front part of the vehicle during the early stage after start of steering operation (or initial head-turning ability), namely, the steering response, can be improved.

Moreover, the feature of implementing the determination at Steps S12 and S15 whether steering operation is being performed by referring to the road wheel speed of each road wheel instead of steering angle δ of the steering wheel as described above, serves to obtain the following advantageous effects.

It is when left and right front wheels 1L, 1R is being steered that the motor torque fluctuating correction control of FIG. 2 is actually required. Incidentally, in the case where it is determined based on steering angle δ of the steering wheel whether or not steering operation is being performed, it is possible that the motor torque fluctuating correction of FIG. 2 is started when left and right front wheels 1L, 1R are not yet steered, because left and right front wheels 1L, 1R are actually steered with a delay from occurrence of steering angle δ of the steering wheel, wherein the delay is due to a delay in response of a steering effort transmitting system.

However, if it is determined based on a difference in road wheel speed whether or not steering operation is being performed, it is determined that steering operation is being performed, when left and right front wheels 1L, 1R are brought into steered condition. This removes the possibility that the motor torque fluctuating correction of FIG. 2 is started when left and right front wheels 1L, 1R are not yet steered, and serves to further ensure the functions described above.

OTHER EMBODIMENT(S)

Although the foregoing describes the example with reference to the drawings in which the present invention is applied to the vehicle in which steerable left and right front wheels 1L, 1R are driven, the present invention may be applied to a vehicle in which left and right rear wheels are driven by a motor instead of or in addition to left and right front wheels 1L, 1R, or may be applied to a vehicle in which road wheels are driven by their respective electric motors. Also in such cases, it is clear that the functions and effects described above can be obtained by the driving force fluctuating correction control of FIG. 2.

Incidentally, the power source for driving road wheels is not limited to a rotary electric power source such as electric motor 2, but may be an engine such as an internal combustion engine. Also in such cases, the functions and effects described above can be obtained by the driving force fluctuating correction control of FIG. 2. However, engines are lower in control response than rotary power sources, so that it is advantageous that the driving force fluctuating correction control of FIG. 2 is applied to a rotary electric power source, to ensure the functions and effects described above.

In the shown example, the motor torque (road wheel driving force) is repeatedly fluctuated by adding the motor torque correction of ±ΔTm of FIG. 3 to the target motor torque of electric motor 2 as a reference. This may be replaced with a method of fluctuating the motor torque (road wheel driving force) as described below.

The first fluctuating method is to repeatedly fluctuate the motor torque (road wheel driving force) by repeatedly adding the motor torque correction of +ΔTm of FIG. 3 to the target motor torque of electric motor 2 and stopping the addition, without the motor torque reducing correction.

The second fluctuating method is to repeatedly fluctuate the motor torque (road wheel driving force) by repeatedly adding the motor torque correction of −ΔTm of FIG. 3 to the target motor torque of electric motor 2 and stopping the addition, without the motor torque increasing correction.

However, the method of repeatedly fluctuating the motor torque (road wheel driving force) by adding the motor torque correction of ±ΔTm to the target motor torque of electric motor 2 as in the shown example is more preferable because deviation from the motor torque is small.

Moreover, when the motor torque (road wheel driving force) is repeatedly fluctuated, it is optional to start at first which one of the increase and the reduction. However, the method of starting with the increase of the motor torque (road wheel driving force) is advantageous in that the effect of improvement of steering response can be also obtained.

It is unnecessary to set the absolute value of driving torque increasing correction ΔTm identical to that of driving torque reducing correction (−ΔTm). Driving torque increasing correction ΔTm and driving torque reducing correction (−ΔTm) may be arbitrary determined within a range satisfying the requirements described above. However, it is preferable to set the absolute value of driving torque increasing correction ΔTm identical to that of driving torque reducing correction (−ΔTm), or set the absolute value of driving torque reducing correction (−ΔTm) smaller, because such settings allow to easily determine motor torque increase time period TM1s and motor torque decrease time period TM2s.

The invention claimed is:

1. A vehicle steering feel improving apparatus for a vehicle, wherein the vehicle is capable of running with a road wheel driven by a driving force from a power source, the vehicle steering feel improving apparatus comprising:
a steering operation detecting means that detects a condition that steering operation is being performed to steer a steerable wheel of the vehicle; and
a driving force fluctuating means that repeatedly fluctuates the driving force to the road wheel, while the steering operation detecting means is detecting the condition that steering operation is being performed.

2. The vehicle steering feel improving apparatus as claimed in claim 1, wherein the steering operation detecting means detects that steering operation is performed, based on a difference in rotational speed among a plurality of road wheels of the vehicle.

3. The vehicle steering feel improving apparatus as claimed in claim 1, wherein the driving force fluctuating means performs at least a driving force increasing operation of increasing the driving force to the road wheel for repeatedly fluctuating the driving force to the road wheel.

4. The vehicle steering feel improving apparatus as claimed in claim 3, wherein the driving force fluctuating means performs the driving force increasing operation first when repeatedly fluctuating the driving force to the road wheel.

5. The vehicle steering feel improving apparatus as claimed in claim 1, wherein the driving force fluctuating means allocates a longer time period to the driving force increasing operation than to a driving force reducing operation, while repeatedly fluctuating the driving force to the road wheel.

6. The vehicle steering feel improving apparatus as claimed in claim 5, wherein the driving force fluctuating means sets the time period of the driving force increasing operation and the time period of the driving force reducing operation to constant ratios, regardless of steering speed.

7. The vehicle steering feel improving apparatus as claimed in claim 1, wherein amount of fluctuation of the driving force is such that a passenger of the vehicle does not feel acceleration nor deceleration.

8. The vehicle steering feel improving apparatus as claimed in claim 1, wherein the driving force fluctuating means sets the driving force to the road wheel to a larger value and to a smaller value than a target driving force as a reference, while repeatedly fluctuating the driving force to the road wheel, wherein the target driving force is determined based on a state of operation of the vehicle.

9. The vehicle steering feel improving apparatus as claimed in claim 1, wherein:
    the vehicle is an electric vehicle in which at least part of the driving force is supplied by an electric motor; and
    the driving force fluctuating means performs through the electric motor a control of repeatedly fluctuating the driving force to the road wheel.

\* \* \* \* \*